United States Patent
Kobayashi et al.

(10) Patent No.: US 12,346,039 B2
(45) Date of Patent: Jul. 1, 2025

(54) ROTATABLE POLYGON MIRROR, OPTICAL DEFLECTOR, SCANNING OPTICAL DEVICE, AND IMAGE FORMING APPARATUS

(71) Applicant: CANON KABUSHIKI KAISHA, Tokyo (JP)

(72) Inventors: Hisanori Kobayashi, Kanagawa (JP); Yoshihiko Tanaka, Shizuoka (JP); Takatoshi Tanaka, Shizuoka (JP); Naoki Matsushita, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 18/460,832

(22) Filed: Sep. 5, 2023

(65) Prior Publication Data

US 2024/0111225 A1    Apr. 4, 2024

(30) Foreign Application Priority Data

Oct. 3, 2022   (JP) ................................ 2022-159268

(51) Int. Cl.
  *G03G 15/04* (2006.01)
  *G02B 26/12* (2006.01)

(52) U.S. Cl.
  CPC ....... *G03G 15/04036* (2013.01); *G02B 26/12* (2013.01)

(58) Field of Classification Search
  CPC ......... G03G 15/04036; G03G 15/0409; G02B 26/12–129; G02B 5/09
  See application file for complete search history.

(56) References Cited

U.S. PATENT DOCUMENTS

| | | | |
|---|---|---|---|
| 5,574,592 A * | 11/1996 | Sano | G02B 5/09 359/833 |
| 9,594,196 B2 | 3/2017 | Hayakawa et al. | |
| 2016/0282524 A1 | 9/2016 | Hayakawa et al. | |
| 2019/0129326 A1* | 5/2019 | Takamura | G02B 26/12 |
| 2019/0322022 A1* | 10/2019 | Ohta | G03G 15/04036 |
| 2019/0322023 A1* | 10/2019 | Matsushita | G02B 26/12 |
| 2023/0280509 A1* | 9/2023 | Takata | G02B 5/09 359/871 |

FOREIGN PATENT DOCUMENTS

| | | |
|---|---|---|
| JP | 2535088 Y2 | 5/1997 |
| JP | 2000-002850 A | 1/2000 |
| JP | 2004-226747 A | 8/2004 |
| JP | 2016-180891 A | 10/2016 |

* cited by examiner

*Primary Examiner* — Carla J Therrien
(74) *Attorney, Agent, or Firm* — Venable LLP

(57) ABSTRACT

A rotatable polygon mirror includes a plurality of reflecting surfaces provided in parallel to a rotational axis direction, first surface and second surface of polygonal shape perpendicular to the plurality of reflecting surface and of which each side is continued to the plurality of reflecting surfaces. The second surface is opposite to the first surface. A through hole penetrates though the first and second surfaces in parallel to the rotational axis direction and to engage with a rotational shaft of a driving portion. As seen in the rotational axis direction, the through hole has substantially similar shape to the polygonal shape of the first and the second surfaces, and vertexes of the similar shape of the through hole are different in phase from apexes of the polygonal shape of the first and second surfaces with respect to a rotational direction of the polygon mirror.

19 Claims, 8 Drawing Sheets

(a)

(b)

ROTATABLE POLYGON MIRROR, OPTICAL DEFLECTOR, SCANNING OPTICAL DEVICE, AND IMAGE FORMING APPARATUS

FIELD OF THE INVENTION AND RELATED ART

The present invention relates to a rotatable polygon mirror, an optical deflector, a scanning optical device, and an image forming apparatus. For example, the present invention is suitable for image forming apparatuses such as laser beam printers and digital copiers which form images on a recording material using a digital photo process, and is especially related to a rotatable polygon mirror in an optical deflector which is mounted on image forming apparatuses.

Conventionally, scanning optical devices used in image forming apparatuses such as laser printers deflect and scan a laser light which is emitted from a light source according to an image signal by an optical deflector which includes a rotatable polygon mirror. The detected and scanned laser light is imaged on a photosensitive drum by a scanning lens such as an fθ lens and forms an electrostatic latent image on the photosensitive drum. The electrostatic latent image on the photosensitive drum is developed into a toner image by a developing device, which is transferred to the recording material such as recording paper. The recording material is then conveyed to a fixing device, and printing is performed by heating and fixing the toner on the recording material.

As a configuration for the optical deflector to be used in the scanning optical device, a technique according to Japanese Laid-Open Patent Application (JP-A) 2016-180891 has been proposed, for example. As shown in FIG. 8, an optical deflector 1000 is provided with a rotatable polygon mirror 1110 made of resin and a rotor 1120 which is a driving means of the rotatable polygon mirror 1110. For the assembly of the rotatable polygon mirror 1110 and the rotor 1120, a rotational shaft center is determined by a peripheral portion of a cylindrical convex portion 1121 which is included in the rotor 1120 engaging with an inner surface of concave shape of the rotatable polygon mirror 1110. Further, positioning of a height in a rotational axis direction is determined by a bottom surface of the rotatable polygon mirror 1110 contacting a base portion of the rotor 1120.

However, according to conventional techniques, heat from the rotor accumulates in an inside space surrounded by the rotatable polygon mirror of concave shape during a driving of the optical deflector, which may increase a temperature of the rotatable polygon mirror. Furthermore, because all sides of the rotational shaft in a circumferential direction contact, that is to say, surface contact the rotor, a configuration of the bottom surface of concave shape of the rotatable polygon mirror is such that heat is easily transmitted to the rotatable polygon mirror via the rotor. From the above, reflecting surfaces and the bottom surface of the rotatable polygon mirror may become deformed due to thermal expansion, which may impair mechanical accuracy, resulting in a decline in optical performance and a deterioration of image quality.

The present invention has been accomplished under such circumstances, and its purpose is to reduce thermal deformation of the rotatable polygon mirror and reduce the decline in optical performance and the deterioration of image quality.

SUMMARY OF THE INVENTION

According to an aspect of the present invention, there is provided a rotatable polygon mirror comprising: a plurality of reflecting surfaces provided in parallel to a rotational axis direction and configured to reflect light; a first surface of polygonal shape perpendicular to the plurality of reflecting surface and of which each side is continued to the plurality of reflecting surfaces; a second surface of polygonal shape opposite to the first surface, perpendicular to the plurality of reflecting surface and of which each side is connected to the plurality of reflecting surfaces; and a through hole configured to penetrate though the first surface and the second surface in parallel to the rotational axis direction and to engage with a rotational shaft of a driving portion, wherein as seen in the rotational axis direction, the through hole has substantially similar shape to the polygonal shape of the first surface and the second surface, and vertexes of the similar shape of the through hole are different in phase from apexes of the polygonal shape of the first surface and the second surface with respect to a rotational direction of the polygon mirror.

Further features of the present invention will become apparent from the following description of exemplary embodiments with reference to the attached drawings.

Figure 4:
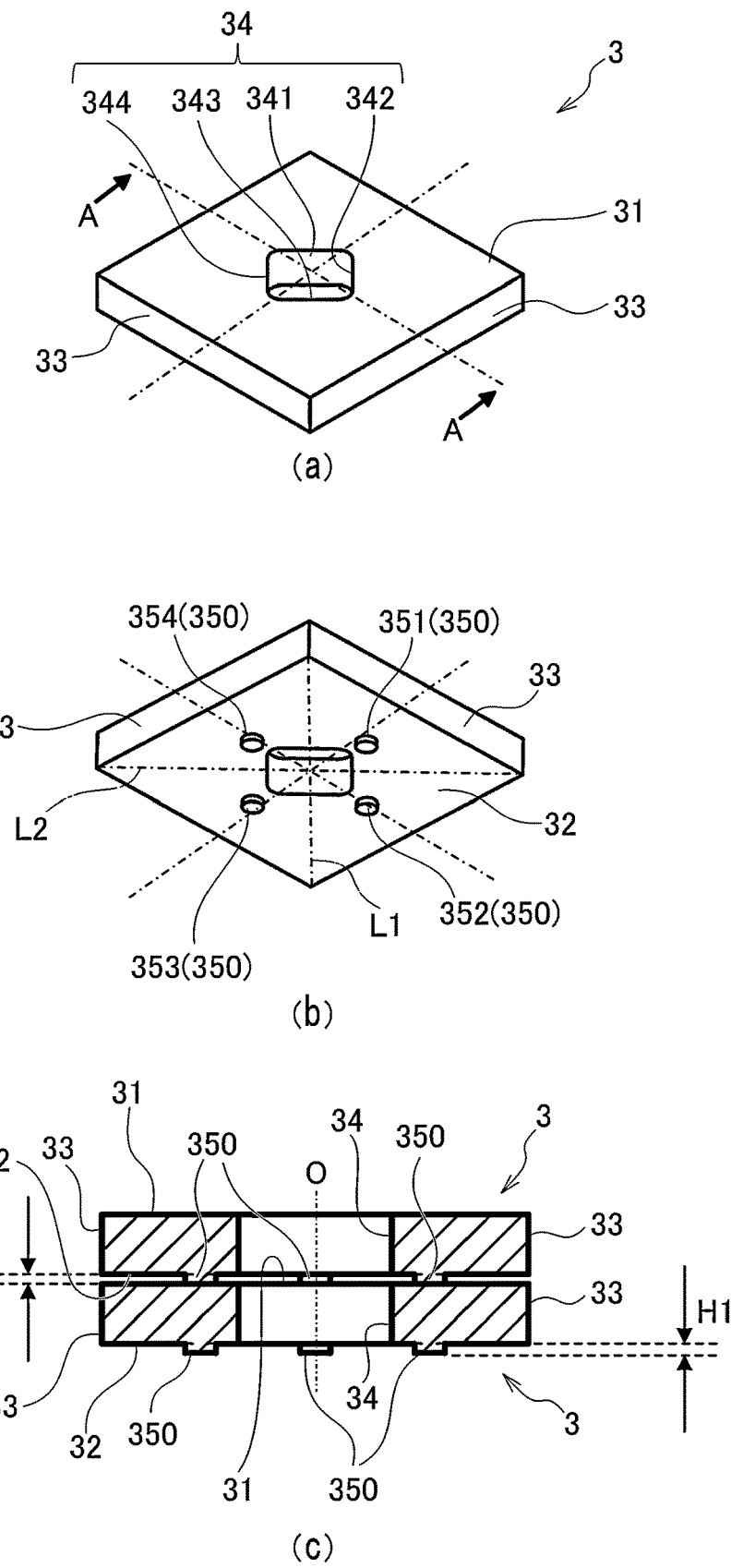

Part (a), part (b), and part (c) of FIG. 4 are a top perspective view, a bottom perspective view, and a sectional view of a rotatable polygon mirror according to the first embodiment.

Figure 5:
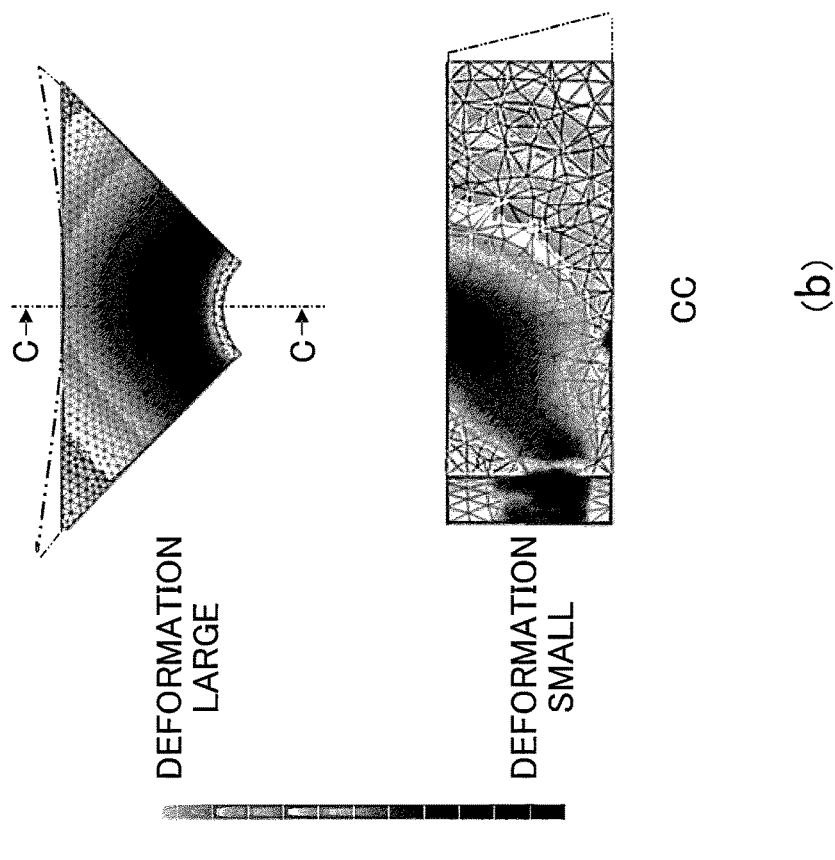
Figure 5:
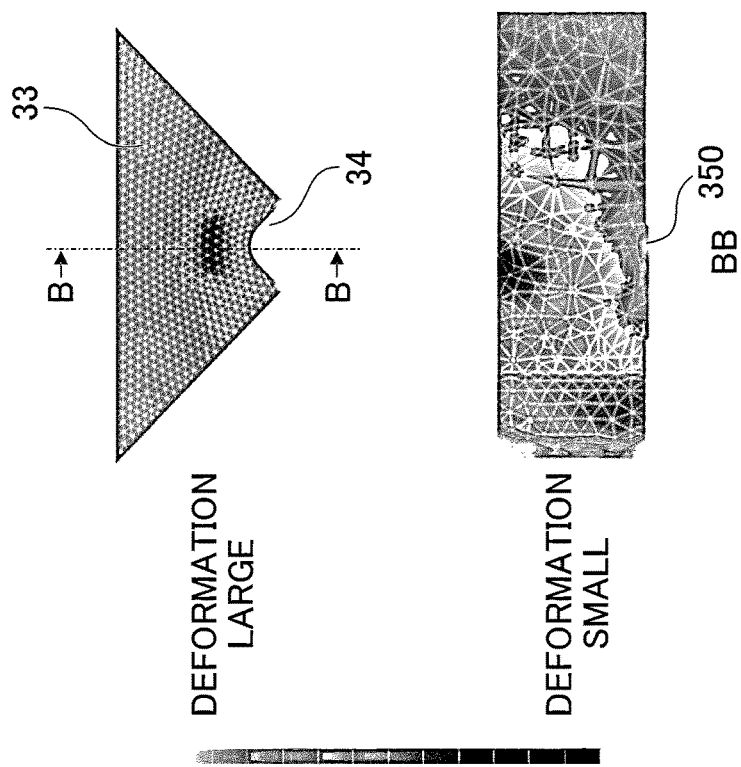

Part (a) of FIG. 5 is a temperature rise distribution diagram of the rotatable polygon mirror according to the first embodiment, and part (b) of FIG. 5 is a temperature rise distribution diagram of a common rotatable polygon mirror.

Figure 6:
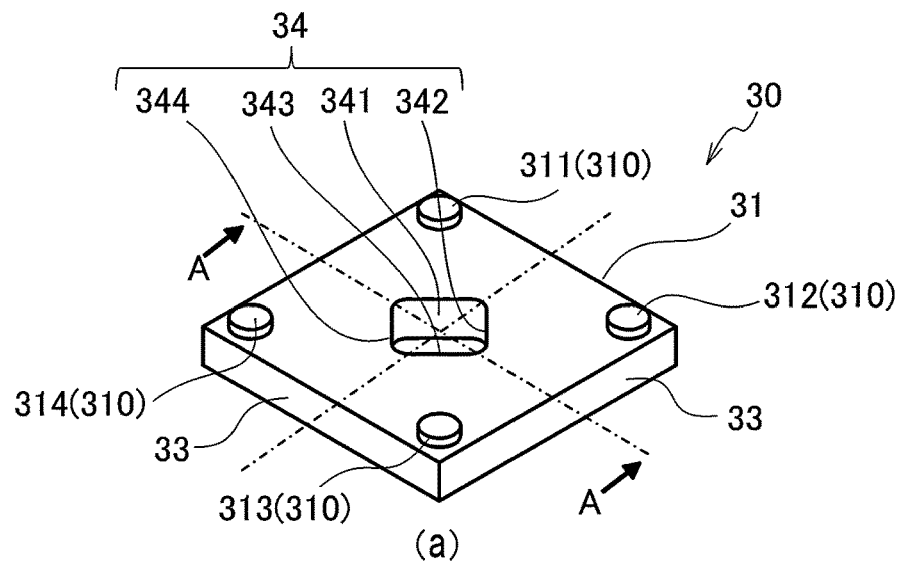
Figure 6:
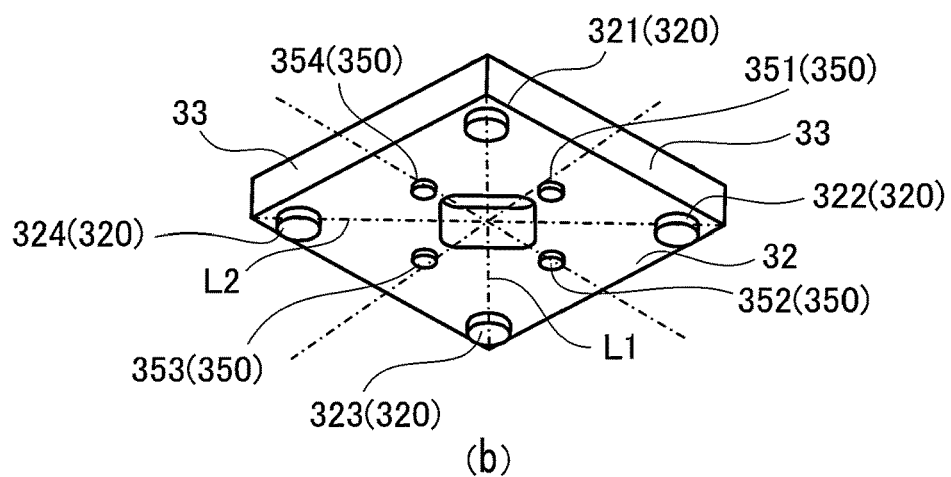
Figure 6:
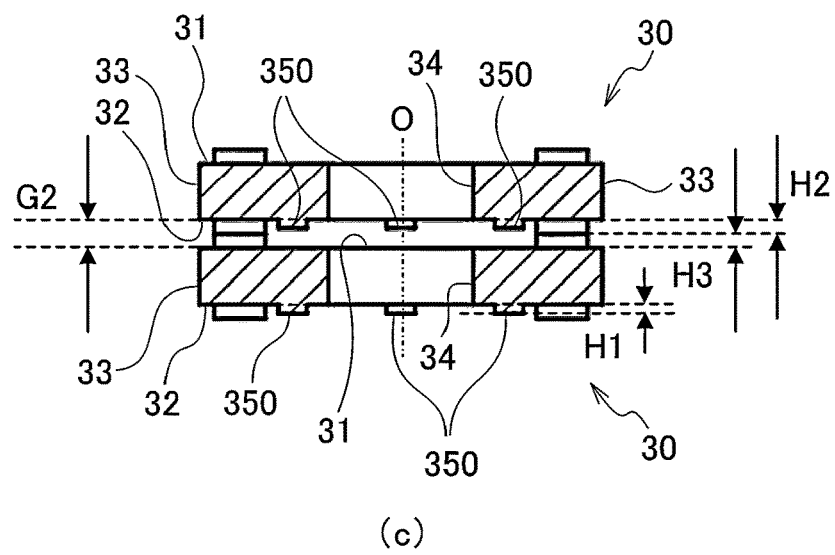

Part (a), part (b), and part (c) of FIG. 6 are a top perspective view, a bottom perspective view, and a sectional view of the rotatable polygon mirror according to the second embodiment.

Figure 7:
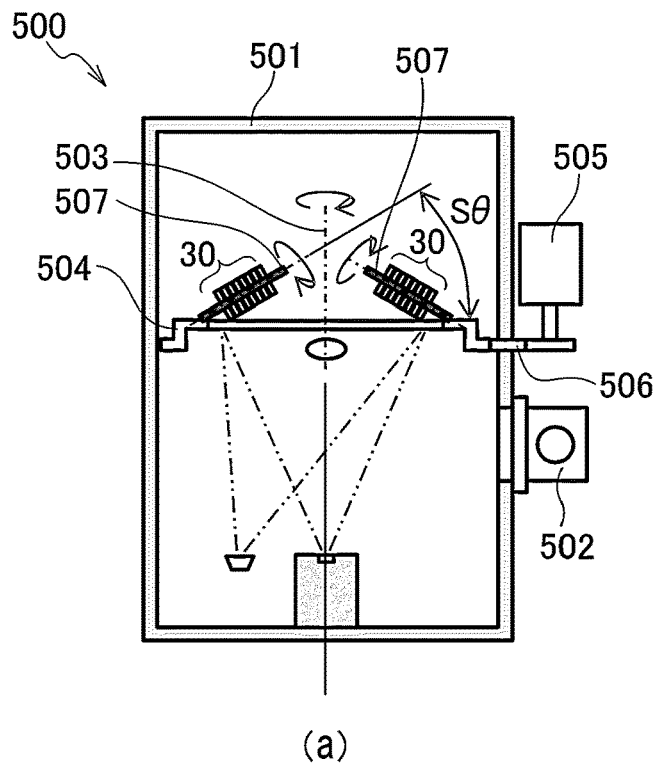
Figure 7:
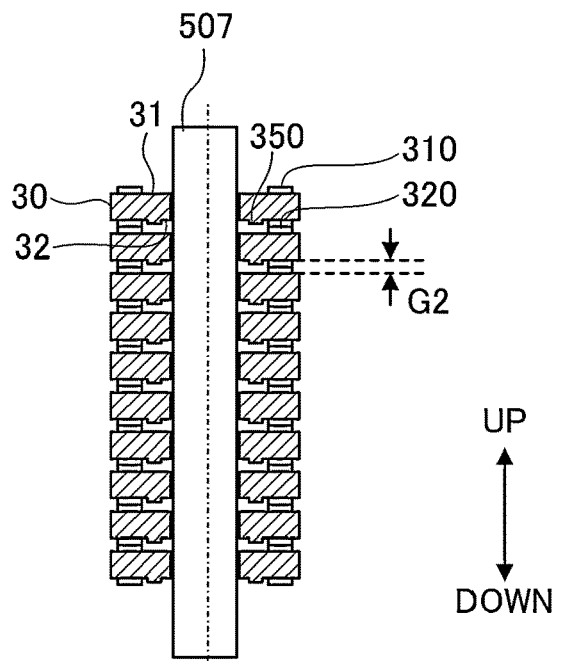

Part (a) of FIG. 7 is a schematic configuration diagram of a film forming device, and part (b) of FIG. 7 is an arrangement cross-sectional view of a rotating shaft component according to the second embodiment.

Figure 8:
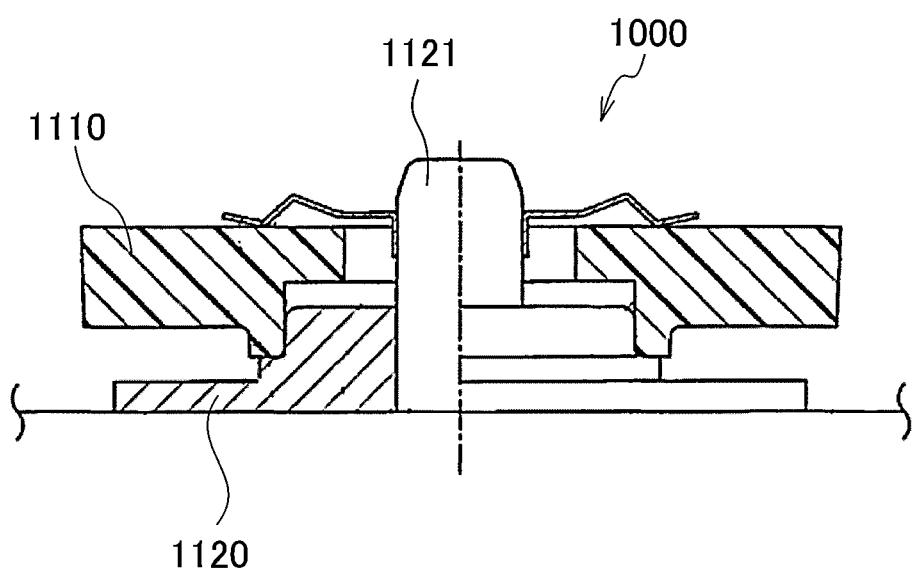

FIG. 8 is a sectional view of a conventional example of a rotatable polygon mirror.

DESCRIPTION OF THE EMBODIMENTS

In the following, embodiments of the present invention will be specifically described with reference to Figures. However, dimensions, materials, shapes, relative arrangements etc. of components described in the present embodiment shall be modified according to the configuration of the devices to which the present invention is applied and other various conditions. That is, a scope of the present invention is not intended to be limited to the configuration of the following embodiments.

First Embodiment

[Image Forming Apparatus]

Figure 1:
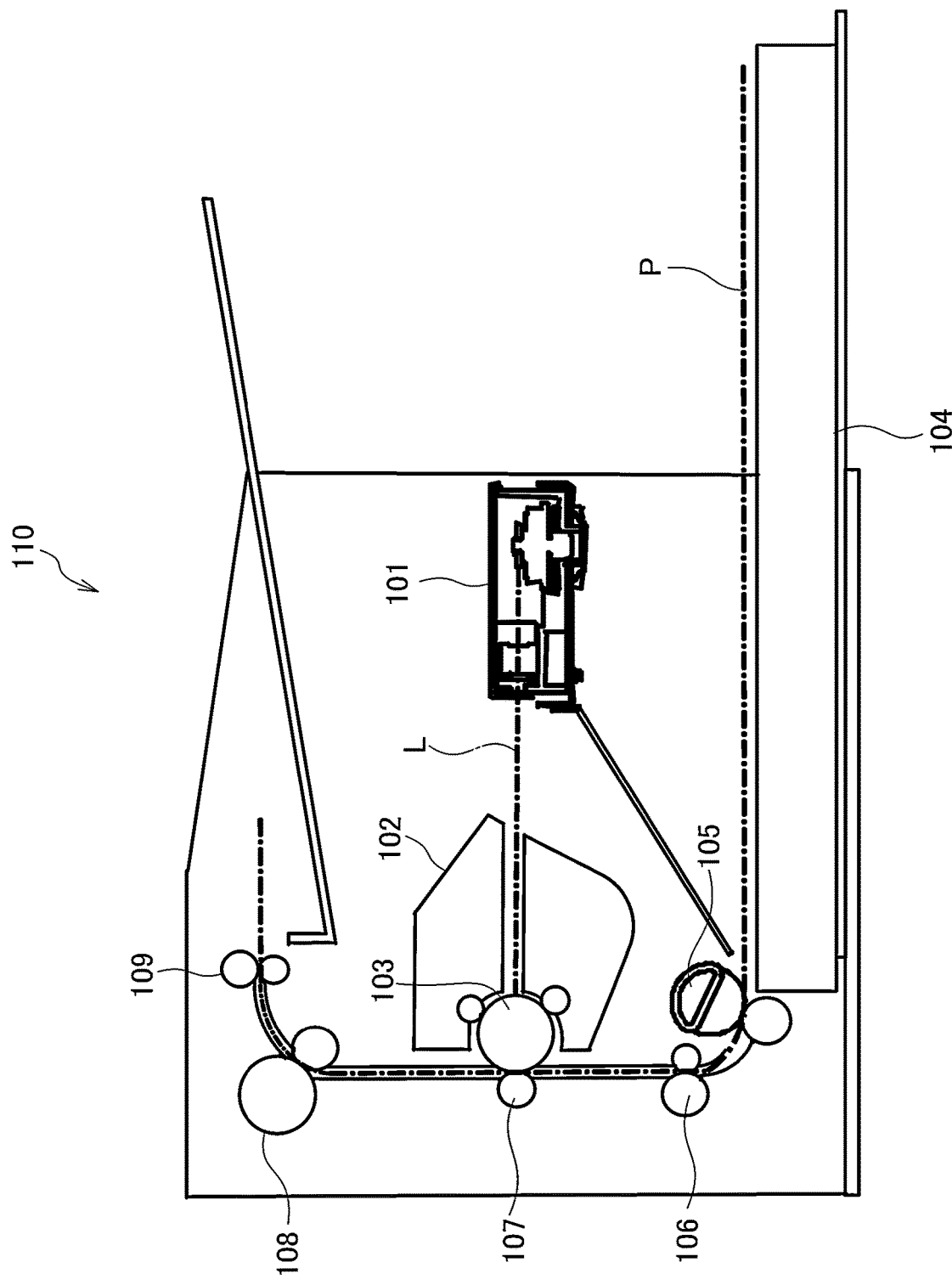
FIG. 1 is a sectional view showing an image forming apparatus according to a first embodiment and a second embodiment.

An image forming apparatus 110 according to a first embodiment will be described by using FIG. 1. FIG. 1 is a schematic cross-sectional view showing the image forming apparatus 110 according to the first embodiment. The image forming apparatus 110 emits a laser light L from a scanning optical device 101, which is an exposure means, based on image data which has been obtained, and irradiates the laser light L onto a photosensitive drum 103 which is an image bearing member incorporated in a process cartridge 102. By doing so, an electrostatic latent image is formed on the photosensitive drum 103, and this electrostatic latent image is developed as a toner image by the process cartridge 102 using toner as a developing agent. Incidentally, the process cartridge 102 includes integrally the photosensitive drum 103, and a charging means and a developing means etc. as processing means which act on the photosensitive drum 103. The processing means are also image forming means which form an image on a recording material P based on the electrostatic latent image.

On the other hand, the recording material P which is stacked on a stacking plate 104 is fed to a conveying passage while the recording material P is separated one sheet by one sheet by a feeding roller 105. The recording material P is then conveyed to a further downstream side by an intermediary roller 106. The toner image formed on the photosensitive drum 103 is transferred on the fed recording material P by the transfer roller 107. The recording material P, on which the unfixed toner image is formed, is conveyed to a further downstream side, and the toner image is fixed to the recording material P by a fixing device 108 which includes a heating member inside. After that, the recording material P is discharged from the apparatus by a discharging roller 109. Incidentally, in the first embodiment, a charging means and a developing means as process means which act on the photosensitive drum 103 are included integrally with the photosensitive drum 103 in the process cartridge 102; however, each process means may be configured separately from the photosensitive drum 103.

[Scanning Optical Device]

Figure 2:
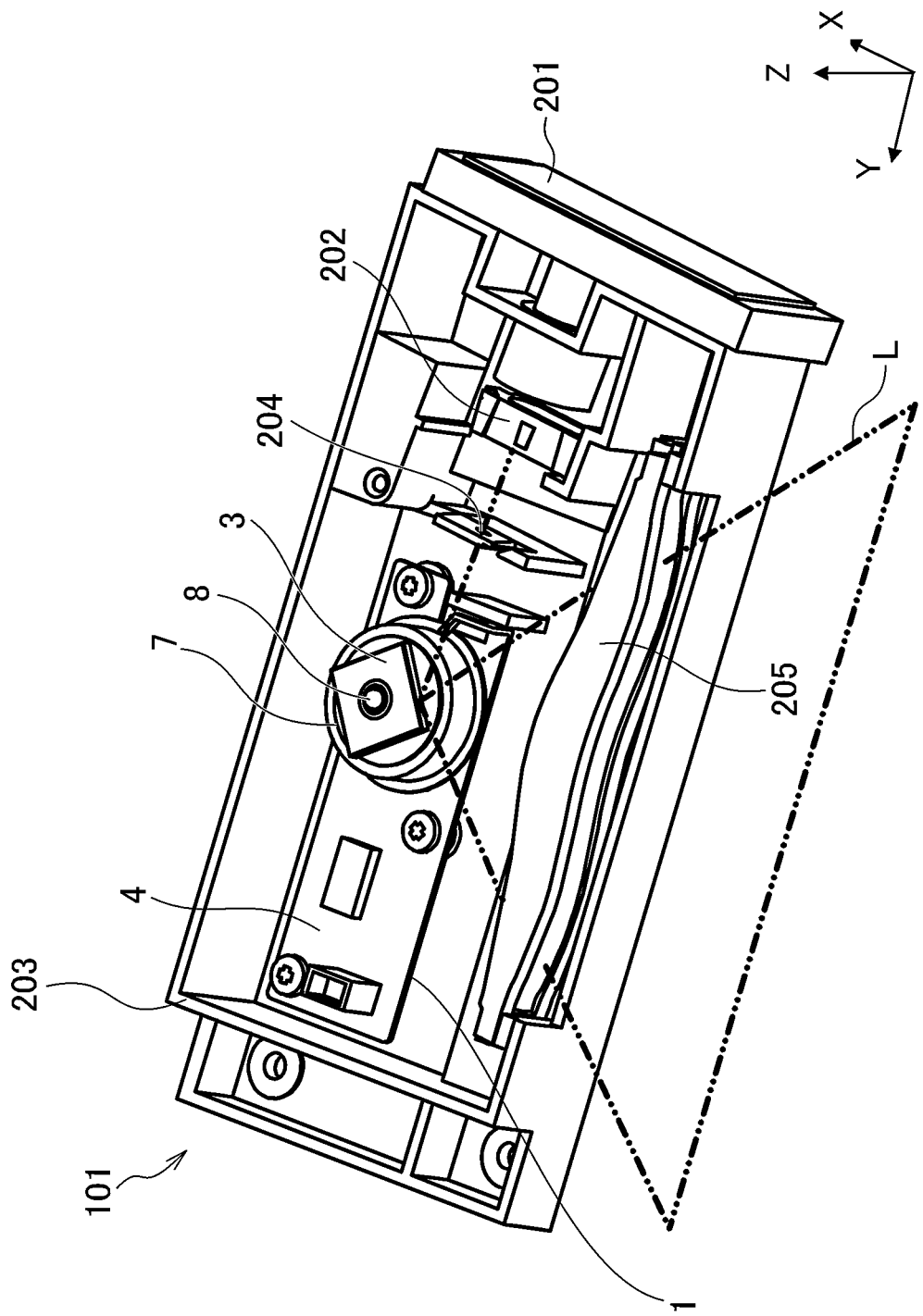
FIG. 2 is a perspective view showing a scanning optical device according to the first embodiment and the second embodiment.

The scanning optical device 101 which is provided by the image forming apparatus 110 will be described by using FIG. 2. FIG. 2 is a perspective view showing a configuration of the scanning optical device 101 according to the first embodiment, and illustrates the scanning optical device 101 from which an optical cover made of resin or metal (not shown), which opens and closes a casing 203, has been removed. The laser light L emitted from a light source device 201 (light source) is condensed in a sub scanning direction by a cylindrical lens 202, and is limited to a predetermined light diameter by an optical diaphragm 204 which is formed in the casing 203. The laser light L is deflected by a rotatable polygon mirror 3 made of resin which is rotatably driven by an optical deflector 1 in a Z-axis rotation. After passing through an fθ lens 205, the laser light L is converged on the photosensitive drum 103 (on the image bearing member) (not shown in FIG. 2) and scanned in a Y-axis direction, then forms an electrostatic latent image. The rotatable polygon mirror 3, a rotor 7, a rotational shaft 8, and a board 4 will be described later. Incidentally, the Y-axis direction is also a main scanning direction, and a direction which is perpendicular to the Y-axis direction is also the sub scanning direction. The Z-axis direction is also the rotational axis direction, and may also be referred to as a vertical direction. Further, a direction which is perpendicular to a YZ plane shall be an X-axis direction. Incidentally, the light source device 201, the cylindrical lens 202 and the optical deflector 1 etc. are stored in the casing 203.

[Optical Deflector]

Figure 3:
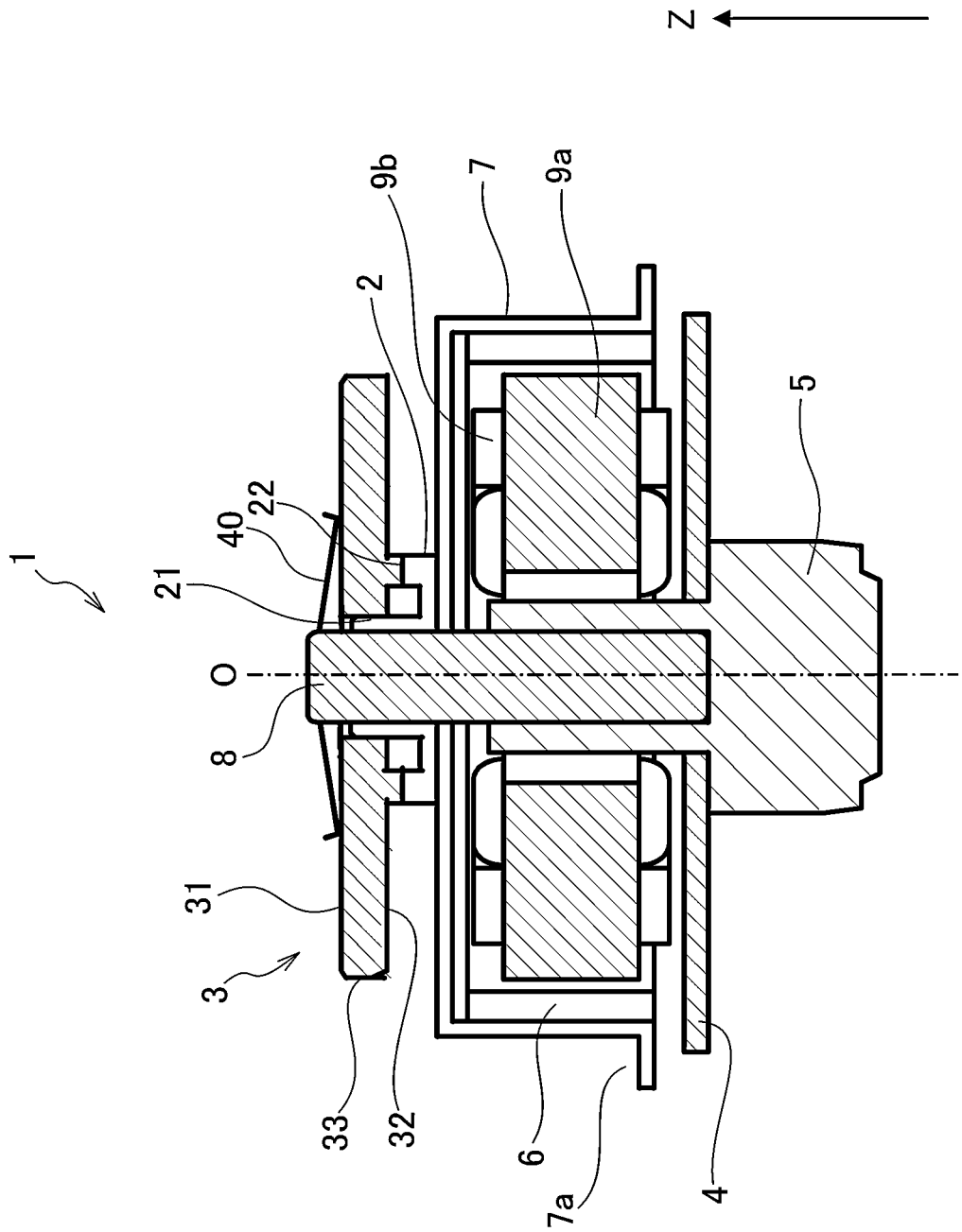
FIG. 3 is a sectional view showing an optical deflector according to the first embodiment.

The optical deflector 1 will be described by using FIG. 3. FIG. 3 is a sectional view of the optical deflector 1. The optical deflector 1 is configured of the rotatable polygon mirror 3, the rotor 7, a pedestal 2, a stator core 9a, and a stator core 9b. The rotatable polygon mirror 3 includes reflecting surfaces 33, which deflect the laser light L, and are made of resin. A bearing sleeve 5 is supported by the board 4 which is configured of a metal plate. The rotor 7 which is a driving means includes the bearing sleeve 5 and a rotor magnet 6. The pedestal 2 includes a rotational shaft portion 21 and a bottom seat portion 22. The rotational shaft portion 21 is an annular shape when seen from a top surface, and its inner circumferential surface contacts a rotational shaft 8 which is integrated with the rotor 7, while its outer circumferential surface contacts a through hole 34 (see FIG. 4) in the rotatable polygon mirror 3, which will be described later. The bottom seat portion 22 contacts pedestal portions 350 (see FIG. 4) of the rotatable polygon mirror 3, which will be described later. The stator core 9a is fixed to the board 4. The stator core 9b is fixed to the stator core 9b. A frame 7a stores the stator core 9a, the stator core 9b, and the rotor magnet 6.

When the stator core 9a is magnetized by a driving current supplied from a driving circuit (not shown) mounted on the board 4, the rotor 7 rotates at a high speed with the rotatable polygon mirror 3, and the optical deflector 1 deflects and scans the laser light L which is irradiated on the reflecting surfaces 33 of the rotatable polygon mirror 3. Furthermore, the optical deflector 1 includes an elastic member 40 which presses the rotatable polygon mirror 3 against the rotor 7 in the rotational axis direction so that the rotor 7 and the rotatable polygon mirror 3 rotate integrally. A first surface 31 and a second surface 32 of the rotatable polygon mirror 3 will be described later. Incidentally, a shaft indicated as a one-dot chain line in FIG. 3 is defined as a rotational shaft O.

[Rotatable Polygon Mirror]

The rotatable polygon mirror 3 will be described in detail by using FIG. 4. Part (a) of FIG. 4 shows a perspective view of the rotatable polygon mirror 3 as seen from the top surface, part (b) of FIG. 4 shows a perspective view of the rotatable polygon mirror 3 as seen from the bottom surface, and part (c) of FIG. 4 shows an A-A arrow sectional view of part (a) of FIG. 4. The rotatable polygon mirror 3 is, for example, made of resin material such as cycloolefin resin, polycarbonate resin, and acryl resin.

The rotatable polygon mirror 3 includes four reflecting surfaces 33, the first surface 31, the second surface 32, the pedestal portions 350, and the through hole 34. A plurality of the reflecting surfaces 33 are provided in parallel in the rotational axis direction and are configured to reflect light.

The four reflecting surfaces 33 form a rectangular parallelepiped along with two opposing sides of square shape. The first surface 31, when seen from the four reflecting surfaces 33 which form the rectangular parallelepiped, is a side of the rectangular parallelepiped, and is a surface which is perpendicular to the reflecting surfaces 33. The first surface 31 is a side of polygonal shape which is perpendicular to the plurality of the reflecting surfaces 33 and of which each side is connected to the plurality of the reflecting surfaces 33, which here is a side of square shape. The second surface 32, when seen from the four reflecting surfaces 33 which form the rectangular parallelepiped, is a side of the rectangular parallelepiped, and is a surface which is approximately parallel to the first surface 31. The second surface 32 is a side of polygonal shape which is perpendicular to the plurality of the reflecting surfaces 33 and of which each side is connected to the plurality of the reflecting surfaces 33, which here is a side of square shape.

The pedestal portions 350 are projections which protrude from the second surface 32 and are provided on four positions on the second surface 32. Four pedestal portions are defined as a pedestal portion 351, a pedestal portion 352, a pedestal portion 353, and a pedestal portion 354. The pedestal portions 350 are provided on the second surface 32 and are provided adjacent to vertexes of a similar shape of the through hole 34, respectively, which will be described later. A shape of the pedestal portions 350 as seen from the second surface 32 is of circular shape in part (b) of FIG. 4; however, it is not limited to this. The shape of the pedestal portions 350 can be determined according to a shape etc. of the bottom seat portion 22 of the pedestal 2.

The through hole 34 is a hole in a rotational center to fit the rotational shaft portion 21 of the pedestal 2. The through hole 34 penetrates through the first surface 31 and the second surface 32 of the rotatable polygon mirror 3 in parallel to the rotational axis direction and engages with the rotational shaft portion 21 which is the rotational shaft included on the rotor 7. The through hole 34 is comprised of planes 341, 342, 343, and 344, in clock-wise order on the surface which forms the hole in part (a) of FIG. 4. When seen from the first surface 31 or the second surface 32, the shape of the through hole 34 is of rectangular shape. Incidentally, a corner portion (a vertex of the rectangular shape) comprised of a plane and a plane can be curved, that is, an R can be attached. The degree of the R shall be in a range which does not have any functional effect.

The rectangular shape of the through hole 34 has substantially similar shape to the four reflecting surfaces 33 of the rotatable polygonal mirror. More precisely, as seen in the rotational axis direction, the through hole 34 has substantially similar shape to the polygonal shape of the first surface 31 and the second surface 32. The phase between the square shape configured by the reflecting surfaces 33 and the square shape configured by the planes on the inner surface (the substantially similar shape) is arranged to be shifted by 45 degrees in a rotational direction. That is, vertexes of the similar shape of the through hole 34 are different in rotation phase from apexes of the polygonal shape of the first surface 31 and the second surface 32 with respect to the rotational axis. This shift is hereinafter referred to as a phase shift.

Here, the square shape configured by the reflecting surfaces 33 is, in other words, the shape of the first surface 31 and the second surface 32.

Incidentally, it is preferable for the phase shift in the rotational direction to be a degree calculated by the following equation, the phase shift (°)=360°/(2×N)=360°/(2×4)=45°

N: a number of sides of the polygonal shape of the through hole 34

This is so that balance during rotation can be maintained in a stable manner because the reflecting surfaces 33 are not configured along a line connecting a center of the rotational shaft portion 21 of the pedestal 2 and a fitting portion between the rotational shaft portion 21 and the plane of the through hole 34, and furthermore, because there is symmetry to the shape of the center of the reflecting surfaces 33. Incidentally, N can also be said to be a number of sides or vertexes of the polygonal shape and the similar shape.

Incidentally, in the first embodiment, the rotatable polygon mirror has been described to include four reflecting surfaces with the first surface 31 and the second surface 32 as square shapes; however, they are not limited to this. For example, the rotatable polygon mirror can be configured to include five reflecting surfaces with the first surface 31 and the second surface 32 as pentagon shapes. In this case, the phase shift will be 36° according to the above equation. In this case, the rotational shaft portion 21 will also be an inscribed circle of the through hole of pentagon shape as seen from the first surface 31 or the second surface 32. In this way, the rotatable polygon mirror can be configured to include the number of reflecting surfaces corresponding to the polygon shape with the first surface 31 and the second surface 32 as polygon shapes. In this case, the phase shift can be determined by the above equation. In this case, the rotational shaft portion 21 will also be an inscribed circle of the through hole of similar shape to the polygon shape as seen from the first surface 31 or the second surface 32.

The pedestal portions 350 (351, 352, 353, 354) are arranged adjacent to the vertexes of the through hole 34, respectively, so that they do not cross a bisector L1 which bisects the plane 341 and the plane 343 of the inner surface, and a bisector L2 which bisects the plane 342 and the plane 344. Further, a height of the pedestal portions 350 is, for example, several tens of m. Because a cross-section of the rotatable polygon mirror 3 maintains substantial symmetry vertically, a formability by the pedestal portions 350 is not affected.

In such a configuration, positioning of the rotational shaft center of the planes 341, 342, 343, and 344, of the through hole 34 which is included on the rotatable polygon mirror 3, and the rotational shaft portion 21 of cylindrical shape which supports the rotational shaft 8, is determined by an engagement by line contact of the phase which does not face the reflecting surfaces 33. That is, the rotational shaft portion 21 of rectangular shape is the inscribed circle of the through hole 34 as seen from the first surface 31 (or the second surface 32). The pedestal portions 350 contact the bottom seat portion 22 at a different position than a rotation phase to which the rotational shaft portion 21 engages to determine positioning in a height direction.

(In a Case of Stacking a Plurality of Rotatable Polygon Mirrors)

For example, there is a case in which the plurality of rotatable polygon mirrors are stacked in the rotational axis direction in the optical deflector 1. Part (c) of FIG. 6 shows a case in which two rotatable polygon mirrors 3 are stacked in the rotational axis direction. In a case in which the plurality of the rotatable polygon mirrors 3 are stacked, the pedestal portions 350 of the rotatable polygon mirror 3 positioned above contact the first surface 31 of the rotatable polygon mirror 3 positioned below. For this reason, the second surface 32 of the rotatable polygon mirror 3 positioned above does not directly contact the first surface 31 of the rotatable polygon mirror 3 positioned below. In this case, a gap G1 is equal to the height (H1) of the pedestal portions 350 (G1=H1).

As described above, according to the first embodiment, for the assembly of the rotatable polygon mirror 3 and the pedestal 2, the through hole 34 and the rotational shaft portion 21 engage by line contact. In addition, heat effect from the rotational shaft portion 21 and the bottom seat portion 22 is dispersed in a circumferential direction of the rotational shaft 8. At the same time, heat conduction to the rotatable polygon mirror 3 can be suppressed because an atmospheric environment adjacent to the rotational shaft portion 21 and the bottom seat portion 22 is released.

[Thermal Deformation]

FIG. 5 shows an example of a simulation result of thermal deformation transmitted to the rotatable polygon mirror 3 from the rotational shaft portion 21 and the bottom seat portion 22 when the rotatable polygon mirror 3 is driven. Part (a) of FIG. 5 is a top view and a sectional view of the rotatable polygon mirror 3 according to the first embodiment during temperature rise. Part (b) of FIG. 5 is a top view and a sectional view of a common rotatable polygon mirror during temperature rise. Incidentally, the sectional view in part (a) of FIG. 5 is a B-B arrow sectional view of the top view of part (a) of FIG. 5, and the sectional view in part (b) of FIG. 5 is a C-C arrow sectional view of the top view of part (b) of FIG. 5. In part (b) of FIG. 5, a configuration excluding the rotatable polygon mirror has similar conditions to the first embodiment and is an example of shaft fitting of a joint part. The common rotatable polygon mirror has a configuration which includes a round through hole, and the rotational shaft center is determined by an engagement of an entire circumference between the through hole and the rotational shaft, that is, an engagement by surface contact, while its height is determined by the bottom surface of the rotatable polygon mirror contacting a rotor of cylindrical shape at a surface. Both part (a) and part (b) of FIG. 5 only illustrate one fourth of the rotatable polygon mirror. Further, in FIG. 5, darker colors indicate less deformation, while lighter colors indicate more deformation.

In the common rotatable polygon mirror in part (b) of FIG. 5, the color of both end portions of the reflecting surface is light as shown in the top view, that is, more deformation occurs, and the rotatable polygon mirror is curved. Further, as shown in the sectional view in part (b) of FIG. 5, the color becomes lighter toward the bottom in the rotational axis direction (vertical direction) of the reflecting surface, that is, more deformation occurs toward the bottom such that the reflecting surface becomes deformed and inclines relative to the rotational axis direction. On the other hand, in part (a) of FIG. 5, less deformation occurs and the deformation is even. In this way, a comparison between part (a) of FIG. 5 with part (b) of FIG. 5 shows a great improvement in a spread of thermal deformation in the reflecting surfaces 33 in the first embodiment as compared to the common rotatable polygon mirror. Thermal expansion has occurred in the reflecting surface of the common rotatable polygon mirror according to the temperature rise, as indicated by a two-dot chain line. On the other hand, it can be seen that deformation in the first embodiment has been reduced to be extremely small.

Incidentally, heat transmitted from the through hole 34 and the pedestal portions 350 in the first embodiment is shown to be local and small, and is superior in suppressing thermal expansion of the fitting portion and the pedestal portions 350 as well as in improving assembly accuracy. Accordingly, a highly accurate and reliable rotatable polygon mirror and optical deflector can be achieved while reducing thermal deformation of the rotatable polygon mirror 3 and without impairing mechanical accuracy of the reflecting surfaces 33 and the pedestal portions 350.

Incidentally, the rotation phase of the polygon of the through hole and the arrangement of the pedestal portions can be disposed in a way that reduces thermal deformation of the reflecting surfaces, the rotational shaft portion, and the pedestal portions. Unless otherwise specified, measurements, materials, shapes, quantities, optical arrangements etc. of components described in the first embodiment are not intended to limit the scope of the present invention.

As described above, according to the first embodiment, it is possible to reduce thermal deformation of the rotatable polygon mirror and reduce the decline in optical performance and the deterioration of image quality.

Second Embodiment

[Rotatable Polygon Mirror]

FIG. 6 is a schematic drawing of the rotatable polygon mirror 30 according to the second embodiment showing a deformation example of the first embodiment. Part (a) of FIG. 6 shows a perspective view as seen from the top surface (the first surface 31) of the rotatable polygon mirror 30, part (b) of FIG. 6 shows a perspective view as seen from the bottom surface (the second surface 32), and part (c) of FIG. 6 shows an A-A arrow sectional view of part (a) of FIG. 6. The same reference numerals will be added for the same functions and shapes described in the first embodiment, and descriptions will be omitted. The feature of the second embodiment is another example of a shape of the rotatable polygon mirror described in the first embodiment.

As shown in part (c) of FIG. 6, first projections 310 (311, 312, 313, and 314) are provided on the first surface 31 adjacent to the vertexes of the reflecting surfaces 33. Further, second projections 320 (321, 322, 323, and 324) are provided on the second surface 32 in positions adjacent to the vertexes of the reflecting surfaces 33 and opposite to the first projections 310. In other words, the first projections 310 are a plurality of projections (311, 312, 313, and 314) provided on the first surface 31 and which are provided adjacent to the vertexes of the polygonal shape of the first surface 31, respectively. The second projections 320 are a plurality of projections (321, 322, 323, and 324) provided on the second surface 32 and which are provided adjacent to the vertexes of the polygonal shape of the second surface 32, respectively.

For example, there may be a case in which the optical deflector 1 is used by stacking the plurality of rotatable polygon mirrors in the rotational axis direction. When the plurality of rotatable polygon mirrors 30 are stacked, the pedestal portions 350 and heights of the first projections 310 and the second projections 320 have a dimensional relationship which satisfies the following relationship. First, a length of the pedestal portions 350 in the rotational axis direction is smaller (shorter) than a length of the first projections 310 in the rotational axis direction and a length of the second projections 320 in the rotational axis direction. The height of the pedestal portions 350 is configured to be lower relative to the heights of the stacked first projections 310 and the second projections 320. That is, the length of the pedestal portions 350 in the rotational axis direction is smaller (shorter) than a sum of the length of the first projections 310 in the rotational axis direction and the length of the second projections 320 in the rotational axis direction.

the height of the second projections 320 (H2)+the height of the first projections 310 (H3)

\> the height of the pedestal portions 350 (H1)

For this reason, as shown in part (c) of FIG. 6, the pedestal portions 350 of the rotatable polygon mirror 30 positioned above do not contact the first surface 31 of the rotatable polygon mirror 30 positioned below. A gap G2 is provided between the second surface 32 of the rotatable polygon mirror 30 positioned above and the first surface 31 of the rotatable polygon mirror 30 positioned below. Incidentally, the gap G2 is the sum of the height of the second projections 320 and the height of the first projections 310 (G2=H2+H3) (>G1 (=H1). Further, in the second embodiment, the height H2 and the height H3 are the same height; however, they are not limited to this. The height H2 and the height H3 can be differing heights. In this case, the relationships should satisfy the following equation: H2>H1, H3>H1, H2+H3>H1.

[Film Forming Device]

Next, a configuration of a film forming device which forms a multilayer film on the rotatable polygon mirror 30 according to the second embodiment will be described by using FIG. 7. Part (a) of FIG. 7 is a schematic diagram showing a vacuum vapor deposition device 500 as an example of the film forming device according to the second embodiment. The vacuum vapor deposition device 500 is provided with a film forming chamber 501 which maintains an interior of the chamber in a vacuum state, and an exhaust system device 502 which is comprised with a vacuum pump etc. that exhausts air from the interior of the film forming chamber 501. A revolving component 504 which can revolve drive around a revolving shaft 503 is arranged inside the film forming chamber 501. The revolving component 504 is driven to revolve by a drive mechanism 505 via a gear 506. The rotatable polygon mirror 30 are arranged so that a rotating shaft component 507 is stacked on the revolving component 504 in a state to pass through the through hole 34, and are driven to rotate by a mechanism (not shown). The rotating shaft component 507 is arranged to be inclined at an angle of Sθ relative to the horizontal direction. The rotatable polygon mirror 30 is driven to revolve by the revolving component 504 and driven to rotate around the rotating shaft component 507, and a film with desired optical characteristics is formed on an exterior surface when the rotatable polygon mirror 30 is being driven to autorotate.

Part (b) of FIG. 7 is a sectional view in an enlarged state of the rotatable polygon mirror 30 which are arranged on the rotating shaft component 507, and also shows the vertical direction. Incidentally, reference numerals are only denoted for the top rotatable polygon mirror 30. For example, the plurality of the rotatable polygon mirror 30 are stacked in the rotational axis direction so that the first surface 31 faces upward relative to an axial direction of the rotating shaft component 507 which has been subjected to a D-cut process. In this case, as shown in part (a) of FIG. 6, it is possible to ensure that the rotation phase of the reflecting surfaces 33 is aligned when the reflecting surfaces 33 are formed during vapor deposition because the through hole 34 of the rotatable polygon mirror 30 is of rectangular shape.

Further, as shown in part (c) of FIG. 6, the first projections 310 and the second projections 320 of the rotatable polygon mirrors 30, which are adjacent to each other in the rotational axis direction, come into contact with each other. As a result, the first projections 310 and the second projections 320 are stacked, and the gap G2 (=H2+H3) is formed between the reflecting surfaces 33.

In such a configuration, the rotation phase of the plurality of the rotatable polygon mirrors 30 is shifted, which prevents the overlapped reflecting surfaces from being shaded and suppresses the occurrence of variations in the state of film formation for each of the reflecting surfaces adjacent to each other, ensuring high quality and stable mass productivity. Accordingly, this shape is effective for suppressing the occurrence of variations in the state of film formation and film thickness of the reflecting surfaces.

Next, the multilayer film formed on the reflecting surfaces 33 is formed across both the first surface 31 and the second surface 32. If there is only a step on the pedestal portions 350, the reflecting surfaces may not be able to absorb the inclination caused by a fitting play between the rotational shaft portion 21 and the through hole 34, and may rub against each other. However, if the first projections 310 and the second projections 320 are provided, a stable gap G2 (>G1) can be ensured. Accordingly, each of the adjacent reflective surfaces can reliably secure an appropriate clearance, which enables stable film formation. In addition, because intermediate components such as spacers between the rotatable polygon mirrors are not required, the equipment can be kept to a minimum, which enables a low-cost, highly productive film forming method.

Furthermore, when the plurality of rotatable polygon mirrors 30 are stacked, shear stress is applied to the rotatable polygon mirrors 30 due to weight and positional restrictions, creating a particular concern for surface deformation of the reflecting surfaces 33. However, since the structure of the rotatable polygon mirror 30 according to the second embodiment is such that facing portions of the first projections 310 and the second projections 320 to which stress is applied uphold each other, surface deformation of the reflecting surface 33 can be suppressed. As a result, mechanical accuracy of the reflecting surfaces 33 during film formation can be ensured, enhancing reliability.

Incidentally, the gap G2 formed by the first projections 310 and the second projections 320 prevents the end portions of the through hole 34 and the pedestal portions 350 from rubbing against each other. As a result, impairment in the accuracy of the rotatable polygon mirror 3 due to scratches and abrasions can be prevented. For this reason, the prevention of a decline in optical performance due to surface tilt and surface deformation etc. caused by the rotatable polygon mirror can be expected.

As described above, according to the second embodiment, in addition to obtaining the same effect as in the first embodiment, it is possible to suppress the occurrence of variations in the state of film formation of the reflecting surfaces, ensuring high quality and stable mass productivity. Accordingly, a highly accurate and reliable optical deflector, which is particularly suitable as a rotatable polygon mirror made of resin, can be achieved.

As described above, according to the second embodiment, it is possible to reduce thermal deformation of the rotatable polygon mirror and reduce the decline in optical performance and the deterioration of image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-159268 filed on Oct. 3, 2022, which is hereby incorporated by reference herein in its entirety.

What is claimed is:

1. A rotatable polygon mirror comprising:
   a plurality of reflecting surfaces provided in parallel to a rotational axis direction and configured to reflect light;
   a first surface of polygonal shape perpendicular to the plurality of reflecting surfaces and of which each side is connected to the plurality of reflecting surfaces;
   a second surface of polygonal shape opposite to the first surface, perpendicular to the plurality of reflecting surfaces and of which each side is connected to the plurality of reflecting surfaces; and
   a through hole configured to penetrate through the first surface and the second surface in parallel to the rotational axis direction and to engage with a rotational shaft of a driving portion,
   wherein as seen in the rotational axis direction, the through hole has a shape which is a same type of polygon as the polygonal shape of the first surface and the polygonal shape of the second surface, and wherein vertexes of the shape of the through hole are different in phase from apexes of the polygonal shape of the first surface and the polygonal shape of the second surface with respect to a rotational direction of the polygon mirror.

2. A rotatable polygon mirror according to claim 1, wherein a shift of the phase satisfies the following equation, the shift of the phase (°)=360°/(2×*N*)

wherein N is defined as a number of sides or vertexes of the polygonal shape and the similar shape.

3. A rotatable polygon mirror according to claim 1, further comprising a plurality of pedestal portions provided on the second surface and adjacent to the vertexes of the shape of the through hole, respectively.

4. A rotatable polygon mirror according to claim 3, further comprising:
a plurality of first projections provided on the first surface and adjacent to the vertexes of the polygonal shape of the first surface, respectively; and
a plurality of second projections provided on the second surface and in positions opposite to the plurality of first projections, respectively.

5. A rotatable polygon mirror according to claim 4, wherein a length of the pedestal portions in the rotational axis direction is shorter than a length of the first projections in the rotational axis direction and a length of the second projections in the rotational axis direction.

6. A rotatable polygon mirror according to claim 4, wherein a length of the pedestal portions in the rotational axis direction is shorter than a sum of a length of the first projections in the rotational axis direction and a length of the second projections in the rotational axis direction.

7. A rotatable polygon mirror according to claim 1, wherein the rotatable polygon mirror is made of resin.

8. A rotatable polygon mirror according to claim 1, wherein the polygonal shape of the first surface is square, the polygonal shape of the second surface is square, and the shape of the through hole is square.

9. An optical deflection device comprising:
a driving portion including a rotational shaft; and
a rotatable polygon mirror rotatably driven by the driving portion,
wherein the rotatable polygon mirror includes
(1) a plurality of reflecting surfaces provided in parallel to a rotational axis direction and configured to reflect light;
(2) a first surface of polygonal shape perpendicular to the plurality of reflecting surfaces and of which each side is connected to the plurality of reflecting surfaces;
(3) a second surface of polygonal shape opposite to the first surface, perpendicular to the plurality of reflecting surfaces and of which each side is connected to the plurality of reflecting surfaces, and
(4) a through hole configured to penetrate though the first surface and the second surface in parallel to the rotational axis direction and to engage with the rotational shaft,
wherein as seen in the rotational axis direction, the through hole has a shape which is a same type of polygon as the polygonal shape of the first surface and the polygonal shape of the second surface, and
wherein vertexes of the shape of the through hole are different in phase from apexes of the polygonal shape of the first surface and the polygonal shape of the second surface with respect to a rotational direction of the polygon mirror.

10. An optical deflecting device according to claim 9, wherein a shift of the phase satisfies following equation, the shift of the phase (°)=360°/(2×*N*)

wherein N is defined as a number of sides or vertexes of the polygonal shape and the shape of the through hole.

11. An optical deflecting device according to claim 9, further comprising a plurality of pedestal portions provided on the second surface and adjacent to the vertexes of the shape of the through hole, respectively.

12. An optical deflecting device according to claim 11, further comprising:
a plurality of first projections provided on the first surface and adjacent to the vertexes of the polygonal shape of the first surface, respectively; and
a plurality of second projections provided on the second surface and in positions opposite to the plurality of first projections, respectively.

13. An optical deflecting device according to claim 12, wherein a length of the pedestal portions in the rotational axis direction is shorter than a length of the first projections in the rotational axis direction and a length of the second projections in the rotational axis direction.

14. An optical deflecting device according to claim 12, wherein a length of the pedestal portions in the rotational axis direction is shorter than a sum of a length of the first projections in the rotational axis direction and a length of the second projections in the rotational axis direction.

15. An optical deflecting device according to claim 9, wherein the rotatable polygon mirror is made of resin.

16. An optical scanning device comprising:
a light source configured to emit a laser light; and
an optical deflecting device according to claim 9, the optical deflecting device being configured to deflect and scan the laser light emitted from the light source.

17. An image forming apparatus comprising:
an image bearing member;
an optical scanning device according to claim 16, the optical scanning device being configured to scan the image bearing member with a laser light and to form an electrostatic latent image; and
an image forming portion configured to form a toner image by developing the electrostatic latent image with toner and to form the toner image on a recording material.

18. A rotatable polygon mirror comprising:
a plurality of reflecting surfaces provided in parallel to a rotational axis direction and configured to reflect light;
a first surface of polygonal shape perpendicular to the plurality of reflecting surfaces and of which each side is connected to the plurality of reflecting surfaces;
a second surface of polygonal shape opposite to the first surface, perpendicular to the plurality of reflecting surfaces and of which each side is connected to the plurality of reflecting surfaces; and
a through hole configured to penetrate through the first surface and the second surface in parallel to the rotational axis direction and to engage with a rotational shaft of a driving portion,
wherein as seen in the rotational axis direction, the through hole has a shape including sides of a number equal to a number of sides of the polygonal shape of the first surface and the polygonal surface of the second surface, and wherein vertexes of the shape of the through hole are different in phase from apexes of the polygonal shape of the first surface and the polygonal shape of the second surface with respect to a rotational direction of the polygon mirror.

19. A rotatable polygon mirror according to claim 18, wherein the through hole has a shape wherein sides thereof, which are equal in number to the number of sides of the polygonal shape of the first surface and the polygonal surface of the second surface and which are straight, are connected by curves.

* * * * *